United States Patent
Matsui et al.

(10) Patent No.: US 11,556,288 B2
(45) Date of Patent: Jan. 17, 2023

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventors: Haruki Matsui, Kanagawa (JP); Toru Nakatani, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 211 days.

(21) Appl. No.: 16/655,216

(22) Filed: Oct. 16, 2019

(65) Prior Publication Data
US 2020/0133595 A1 Apr. 30, 2020

(30) Foreign Application Priority Data

Oct. 25, 2018 (JP) .............................. JP2018-201064

(51) Int. Cl.
*G06F 3/12* (2006.01)
*H04N 1/00* (2006.01)
*G06F 3/048* (2013.01)
*G06F 3/04817* (2022.01)

(52) U.S. Cl.
CPC ........ *G06F 3/1225* (2013.01); *G06F 3/04817* (2013.01); *G06F 3/123* (2013.01); *G06F 3/1204* (2013.01); *H04N 1/00482* (2013.01); *H04N 1/00506* (2013.01)

(58) Field of Classification Search
CPC combination set(s) only.
See application file for complete search history.

(56) References Cited

U.S. PATENT DOCUMENTS

| 8,984,388 | B2 | 3/2015 | Seo et al. | |
|---|---|---|---|---|
| 9,672,338 | B1* | 6/2017 | Kim | ........................ G06F 21/10 |
| 10,180,831 | B2 | 1/2019 | Seo et al. | |
| 2009/0210820 | A1* | 8/2009 | Adachi | .................. G06F 3/0481 715/788 |
| 2014/0165006 | A1* | 6/2014 | Chaudhri | ............ G06F 3/04886 715/835 |
| 2014/0196026 | A1* | 7/2014 | Seo | ........................... G06F 8/61 717/178 |
| 2017/0242553 | A1* | 8/2017 | Dey | ........................ G06Q 50/01 |
| 2018/0300090 | A1* | 10/2018 | Lin | ........................ G06F 3/1204 |
| 2019/0149677 | A1* | 5/2019 | Sone | .................. H04N 1/00503 358/1.13 |

FOREIGN PATENT DOCUMENTS

JP 2013-542490 11/2013

* cited by examiner

*Primary Examiner* — Helen Zong
(74) *Attorney, Agent, or Firm* — JCIPRNET (57) ABSTRACT

An information processing apparatus includes a reception unit that receives an instruction to install a function in a device connected to a communication line, and receives designation of a display location of a selection part used to select the function on a screen displayed in the device in a case where the function is installed in the device, and a control unit that controls the screen of the device such that the selection part of the function is displayed in the display location, in which the designation is received in the reception unit, on the screen of the device.

18 Claims, 7 Drawing Sheets

| 1 | 2 | 3 | 4 |
|---|---|---|---|
| 5 | 6 | 7 | 8 |
| 9 | 10 | 11 | 12 |

FIG. 8B

| 1 | 2 | 3 |
|---|---|---|
| 4 | 5 | 6 |
| 7 | 8 | 9 |
| 10 | 11 | 12 |

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2018-201064 filed Oct. 25, 2018.

BACKGROUND

(i) Technical Field

The present invention relates to an information processing apparatus and a non-transitory computer readable medium storing an information processing program.

(ii) Related Art

JP2013-542490A discloses a method for installing an application of a terminal device. The method includes inputting a command which is used to download the application, selecting a page to which an identifier used to execute the application is added, and displaying the identifier in the selected page.

As above, in a case where an application is installed in a device, such as a smartphone, an icon, which is an example of a selection part used to select the application, is displayed on a screen of the device.

In addition, for example, in a case where a user directly operates the device and installs the application with regard to display of the icon on the screen of the device, a device exists which is capable of selecting a page, on which the icon of the application to be installed is displayed, of the screen according to a type of the device.

SUMMARY

A method for installing an application in a device is not limited to a form in which installation is performed in such a way that a user directly operates the device. For example, in a case where a company prepares a plurality of devices for employees and the devices are used to conduct business, there is a case where a manager who has specialized knowledge with regard to the devices installs the application in each of the devices instead of the employees who use the devices.

In this case, it is inefficient that the manager installs the application in the device one by one by directly operating the device. Therefore, there is a case where the manager installs the application in each of the devices from a server through a communication line.

However, until now, in a case where a function, which is realized by the application from a remote place through the communication line, is installed, it is not possible to designate a display location of an icon which is displayed on a screen of each of the devices. That is, the display location of the icon is determined according to each of the devices based on specification, which is relevant to the installation of the application, of the device and it is not possible for the manager to manage the display location of the icon of each of the devices.

Aspects of non-limiting embodiments of the present disclosure relate to an information processing apparatus and a non-transitory computer readable medium storing an information processing program, which are capable of designating a display location of a selection part of the function displayed on the screen of the device in association with installation even in a case where the function is installed in the device in the remote place through the communication line.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a reception unit that receives an instruction to install a function in a device connected to a communication line, and receives designation of a display location of a selection part, which is used to select the function, on a screen displayed in the device in a case where the function is installed in the device; and a control unit that controls the screen of the device such that the selection part of the function is displayed in the display location, in which the designation is received in the reception unit, on the screen of the device.

BRIEF DESCRIPTION OF THE DRAWINGS

Exemplary embodiment (s) of the present invention will be described in detail based on the following figures, wherein.

DETAILED DESCRIPTION

Hereinafter, an exemplary embodiment will be described with reference to the accompanying drawings. Meanwhile, the same reference symbols are attached to components and processes which have the same function, and explanations thereof are not repeated.

Figure 1:
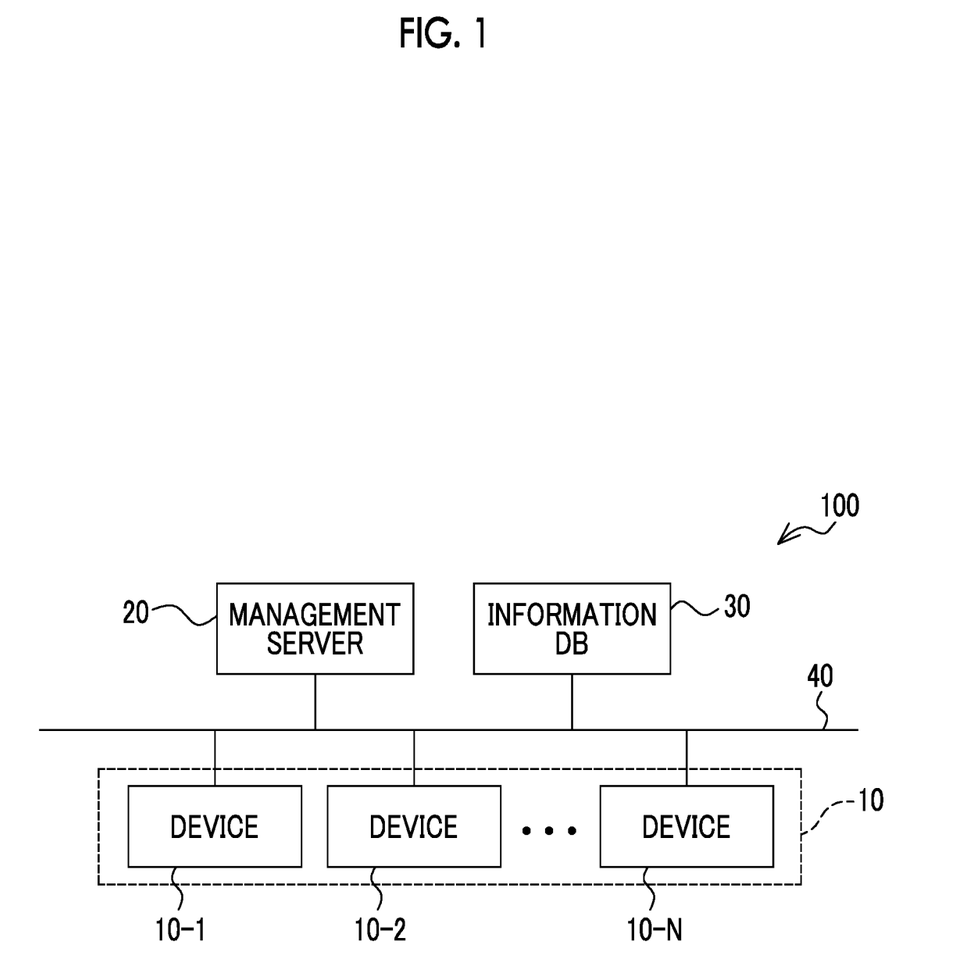
FIG. 1 is a diagram illustrating an example of a configuration of an information processing system.

FIG. 1 is a diagram illustrating an example of a configuration of an information processing system 100 according to the exemplary embodiment. The information processing system 100 includes at least one or more devices 10, a management server 20, and an information Database (DB) 30. The devices 10, the management server 20, and the information DB 30 are respectively connected through a communication line 40.

The device 10 is a device that executes a function, which is provided by an application, in a case where the application, which is installed in the device 10, is selected by the user. The user executes the function, which is provided by the application, by selecting an icon which is displayed on a screen included in the device 10 and which is associated with the application. That is, the function, which is provided by the device 10, is not determined in advance and changes according to the application to be installed.

Accordingly, the device 10 is not limited to a specific device in a case of a device which changes the included function according to the application and executes the function by selecting the icon displayed on the screen. For example, the device 10 may be any type of device including a home electrical appliance or a remote controller, which instructs to execute the function by selecting an icon displayed on a screen, a communication equipment, such as a remote controller, a router, or a firewall, and an image forming device which includes copy, printer, fax, and scanner functions, in addition to information equipment such as a computer, a smartphone, a tablet-type terminal, or a wearable device which is mounted on an arm or a face.

In addition, installation places of the devices 10 are not restricted in a case where the devices 10 are connected to the communication line 40. The respective devices 10 may be installed in the same place or may be installed in different places.

Meanwhile, in FIG. 1, N devices 10-1 to 10-N (N is an integer which is equal to or larger than 1) are connected to the communication line 40. However, in a case where it is not necessary to discriminately describe the devices 10-1 to 10-N, the N devices 10 are collectively expressed as the "device 10".

The management server 20 is an information processing apparatus which unitarily manages the application to be installed in the device 10. Specifically, the management server 20 performs a process of adding, updating, and removing an application with respect to each device 10 in accordance with an instruction of a manager who operates the management server 20.

A case where the application is added to the device 10 is referred to as "installation" and a case where the application which is installed is removed from the device 10 is referred to as "uninstallation". In addition, a function of the device 10 is implemented by installing the application. Therefore, a case where the application is installed in the device 10 corresponds to a case where "the function is installed". In addition, regardless of with or without compensation of the application, the application is an example of a "product" because the application is a worthy property which provides the function to the device 10.

The management server 20 is installed in a range in which it is difficult to simultaneously be in contact with the management server 20 while being in contact with the device 10, that is, a place which is different from the installation place of the device 10 (hereinafter, referred to as a "remote place"). Accordingly, in a case where the manager who operates the management server 20 manages, for example, the application of the device 10, moves to a place where the device 10 exists, and manage the device 10 by operating the device 10 one by one, time is required for movement. Therefore, the manager manages the application from the remote place through the communication line 40.

The information DB 30 is a storage device which stores pieces of information (hereinafter, referred to as "product information") relevant to each application which is installed in the device 10 and information (hereinafter, referred to as "user information") relevant to the user who uses the device 10.

Here, description is performed while assuming that the pieces of product information and the user information are stored in the information DB 30 in advance, as an example. However, the pieces of product information and the user information may be stored in a storage device of the management server 20. In this case, the information DB 30 is not necessary in the information processing system 100.

The management server 20 acquires the pieces of product information and the user information from the information DB 30, and displays information of an application which is completely installed for each device 10 and information of an application which corresponds to a model of the device 10 and which is not installed yet in the device 10 (hereinafter, there is a case of being referred to as a "usable application"). The manager manages the device 10 with reference to the information displayed in the management server 20. Meanwhile, the pieces of product information and the user information will be described in detail later.

Figure 2:
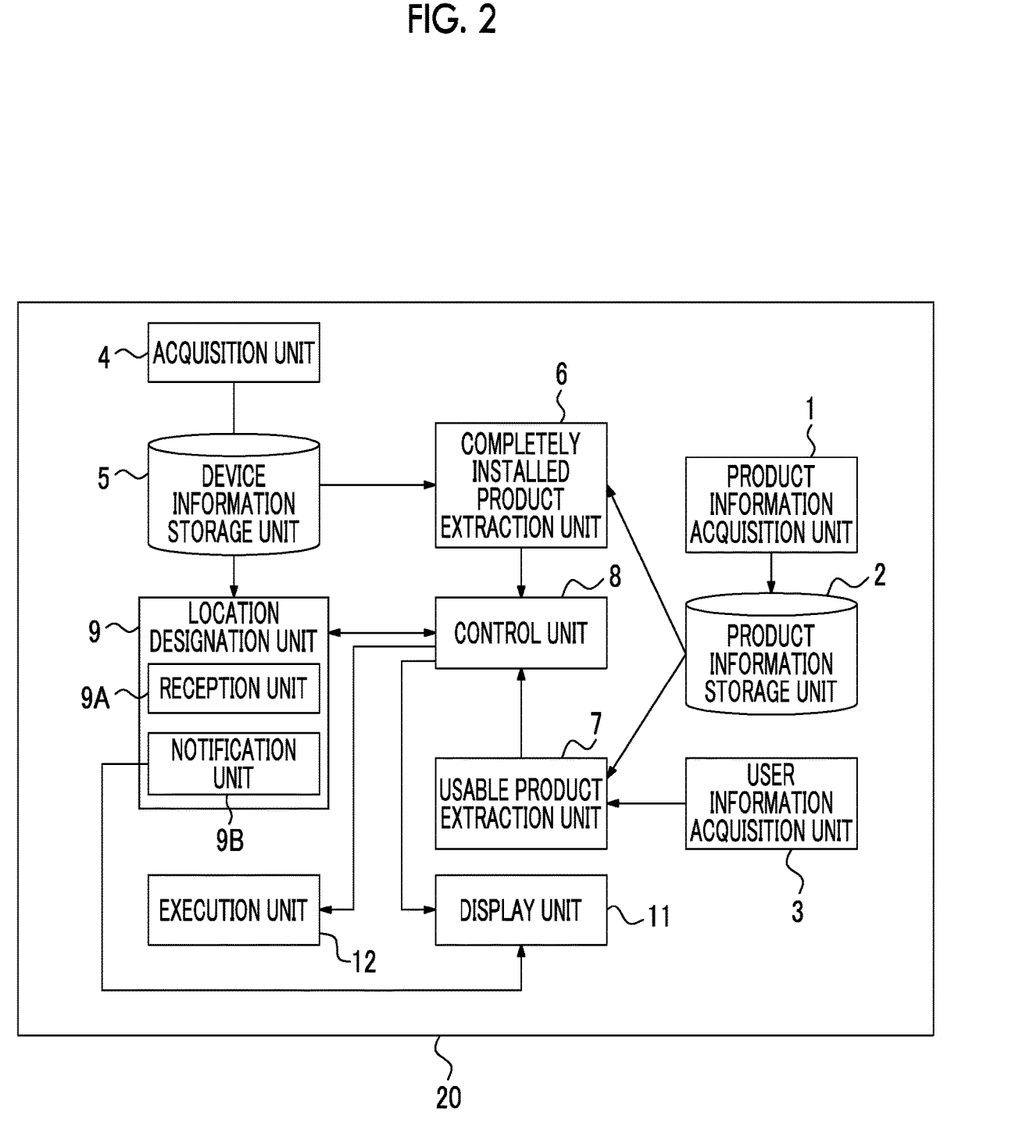
FIG. 2 is a diagram illustrating an example of a functional configuration of a management server.

FIG. 2 is a diagram illustrating an example of a functional configuration of the management server 20. As illustrated in FIG. 2, the management server 20 includes a product information acquisition unit 1, a product information storage unit 2, a user information acquisition unit 3, an acquisition unit 4, a device information storage unit 5, a completely installed product extraction unit 6, a usable product extraction unit 7, a control unit 8, a location designation unit 9, a display unit 11, and an execution unit 12.

The product information acquisition unit 1 acquires the pieces of product information of all the applications, which are capable of being installed in the device 10 from the management server 20 through the communication line 40, from the information DB 30 in a case where the management server 20 is driven or at a timing in which the manager provides an instruction.

The product information includes, for example, an application name, a version, a provision start date, a target model, an input source Uniform Resource Locator (URL) of the application, and a file name or a version of each module which forms the application. In a case of information which is relevant to the application, the product information is not limited to the above information, and may include another information.

The product information acquisition unit 1 notifies the product information, which is acquired from the information DB 30, to the product information storage unit 2.

The product information storage unit 2 stores the product information, which is received from the product information acquisition unit 1, in the storage device for each application.

The user information acquisition unit 3 acquires the user information of the user who uses the device 10 from the information DB 30 in the time in which the management server 20 is driven or at the timing in which the manager provides the instruction.

The user information is used in a case where, for example, the device 10, such as a smartphone, which is distributed to each user and is occupied and used by the user, is managed. The user information includes, for example, information such as a user name of the user who uses the device 10, an application name of an application (acquirable application) which is acquirable by the user, and an application name of an application (completely installed application) which is already used in the device 10 by the user. The acquirable application is an application which is suitable for the model of the device 10 which is used by the user regardless whether or not the user already acquires the application, and an application, which is acquirable from the management server 20, of the device 10.

In a case of information relevant to the user, the user information is not limited to the above information, and may include another information.

The user information acquisition unit 3 notifies the user information, which is acquired from the information DB 30, to the usable product extraction unit 7 which will be described later.

The acquisition unit 4 acquires device information from the device 10 through the communication line 40 in the case where the management server 20 is driven or at the timing in which the manager provides the instruction.

The device information is, for example, information used to identify the device 10, and information, such as a function included in the device 10 or a specification of the device 10, which specifies the device 10 and indicates a feature of the device 10. Specifically, the device information includes a model name of the device 10, a name and a version of a completely downloaded application, and information of a configuration of the screen. Meanwhile, in a case of information relevant to the device 10, the device information is not limited to the above information and may include another information.

The information of the configuration of the screen is, for example, information, such as a size of the screen, a resolution, or a disposition shape of icons displayed on the screen, which indicates an attribute of display on a screen. In addition, the disposition shape of the icons is information relevant to a disposition of the icons, the information which indicates the number of icons that are disposed in a horizontal direction (a row direction) of the screen and a vertical direction (a column direction) of the screen, respectively.

Meanwhile, it is not necessary to dispose the icons to be arranged in a grid shape along the vertical direction and the horizontal direction of the screen, and the icons may be disposed in, for example, a circular shape. In a case where the icons are disposed in a shape other than the grid shape, the information of the configuration of the screen includes information which indicates the shape of icons, the number of icons, and a location of the screen where the icons are disposed.

The acquisition unit 4 notifies the device information, which is acquired from the device 10, to the device information storage unit 5.

The device information storage unit 5 stores the device information, which is received from the acquisition unit 4, in the storage device for each device 10.

In a case where the device information is stored in the device information storage unit 5, the completely installed product extraction unit 6 acquires the device information of the device 10, which is designated by the manager, from the device information storage unit 5, and extracts the completely installed application of the device 10. In this case, the completely installed product extraction unit 6 may acquire the product information of the completely installed application, which is extracted, from the product information storage unit 2, and may associate the product information with the completely installed application.

The completely installed product extraction unit 6 notifies the information, which includes a name of the completely installed application of the device 10, to the control unit 8.

In contrast, the usable product extraction unit 7 extracts the usable application from the acquirable application with reference to the name of the acquirable application and the name of the completely downloaded application which are included in the user information received from the user information acquisition unit 3. The usable application is an application, which is not installed in the designated device 10, in the acquirable application, and the manager selects an application to be added to the device 10 from the usable application.

In addition, the usable product extraction unit 7 may acquire the product information of the extracted usable application from the product information storage unit 2, and may associate the product information with the usable application.

The usable product extraction unit 7 notifies information, which includes a name of the usable application with respect to the device 10, to the control unit 8.

The control unit 8 controls respective functional units included in the management server 20, and executes a process according to the instruction of the manager in the management server 20.

For example, in a case where the control unit 8 receives the name of the completely installed application and the name of the usable application, which are respectively designated from the completely installed product extraction unit 6 and the usable product extraction unit 7, of the device 10, the control unit 8 controls the display unit 11 according to the instruction of the manager and causes the display section 29 of the management server 20 to display a list of completely installed applications and a list of usable applications.

In contrast, the location designation unit 9 is a functional unit that performs a process relevant to designation of a display location of the icon on a screen of the device 10 in which the application is installed, and includes a reception unit 9A and a notification unit 9B.

The reception unit 9A receives an application, which is selected by the user from among the usable applications displayed on the display section 29, and notifies the received application to the control unit 8. The usable application, which is selected by the user, is installed in the device 10, and thus the reception unit 9A receives an application installment instruction.

In addition, the reception unit 9A receives the designation of the display location of the icon on the screen of the device 10 after the application selected by the user is installed in the device 10, and notifies the received designation of the display location to the control unit 8.

The control unit 8 generates layout information, which is used to prescribe a layout of the icon displayed on the screen of the device 10, such that the icon of the application is displayed in the display location received from the reception unit 9A of the location designation unit 9, and notifies the layout information of the icon and the application installment instruction to the execution unit 12.

The execution unit 12 installs the designated application in the device 10 according to the instruction of the control unit 8, and transmits the layout information of the icon to the device 10, thereby performing setting such that the icon of the installed application is displayed in the display location which is received in the reception unit 9A.

The control unit 8 not only installs the application but also controls a process of updating and removing the application, which is installed in the device 10, according to the instruction of the manager. Accordingly, in a case where the execution unit 12 receives an instruction to update and remove the application from the control unit 8, the execution unit 12 updates and removes the designated application of the designated device 10.

Meanwhile, since the user executes the application by selecting the icon of the application displayed on the screen of the device 10, the icon of the application functions as a selection part which is used for the user to select a function to be executed in the device 10.

The notification unit 9B of the location designation unit 9 notifies, for example, a response, which indicates that it is not possible to dispose the icon in the display location of the icon received in the reception unit 9A, with respect to the designation, which is performed by the manager, of the display location of the icon to the manager through the display unit 11.

Figure 3:
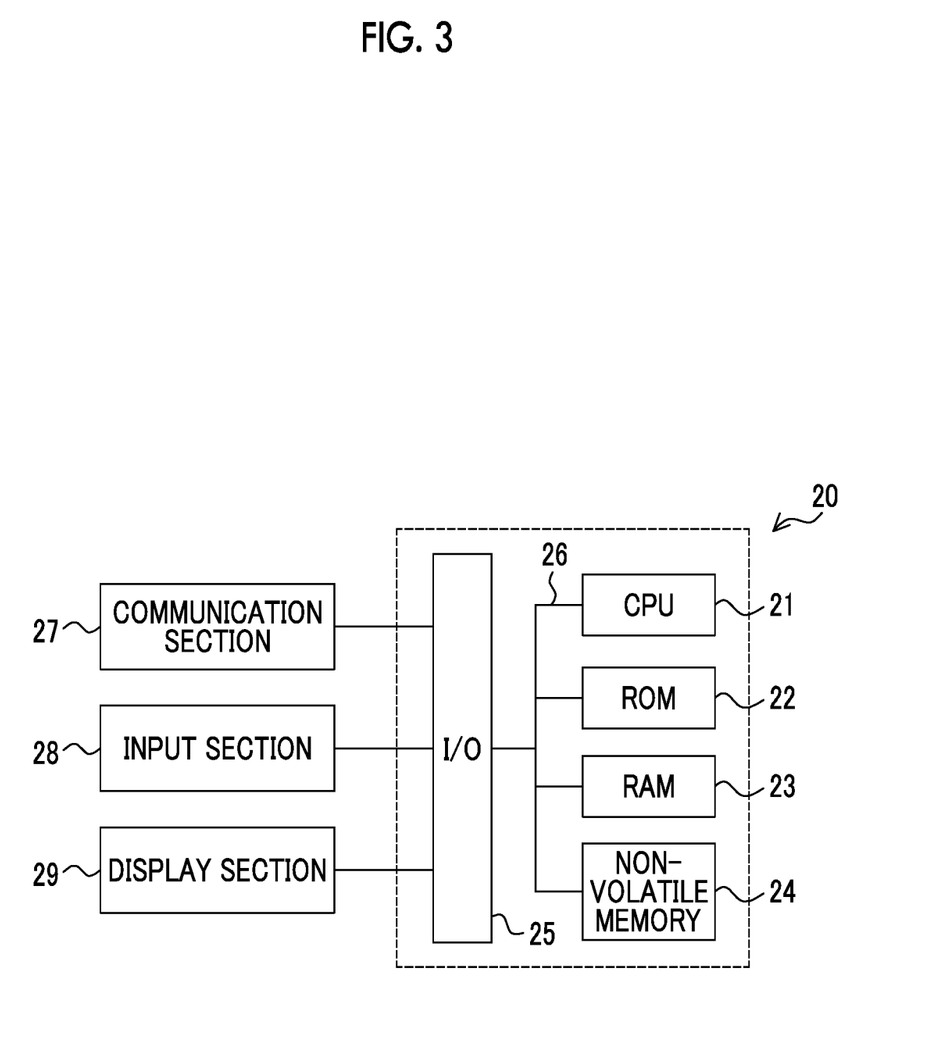
FIG. 3 is a diagram illustrating an example of a configuration of main parts of an electrical system in the management server.

FIG. 3 is a diagram illustrating an example of a configuration of main parts of an electrical system in the management server 20. The management server 20 is formed using, for example, a computer.

The management server 20, which is formed using the computer, includes a Central Processing Unit (CPU) 21 which is in charge of processing the respective units illustrated in FIG. 2, a Read Only Memory (ROM) 22 which stores an information processing program, a Random Access Memory (RAM) 23 which is used as a temporary operation area or a storage area of the CPU 21, a non-volatile memory 24, and an input and output interface (I/O) 25. Further, the CPU 21, the ROM 22, the RAM 23, the non-volatile memory 24, and the I/O 25 are connected to each other through a bus 26.

The non-volatile memory 24 is an example of a storage device in which the stored information is maintained even in a case where electric power supplied to the non-volatile memory 24 is cut. Although, for example, a semiconductor memory is used as the non-volatile memory 24, a hard disk may be used. In a case where the product information and the user information are stored in the management server 20 instead of the information DB 30, the product information and the user information are stored in the non-volatile memory 24.

In contrast, for example, the communication section 27, the input section 28, and the display section 29 are connected to the I/O 25.

The communication section 27 is connected to the communication line 40, and includes a communication protocol used to communicate with various devices, such as the device 10 and the information DB 30, which are connected to the communication line 40.

The input section 28 is an input device which receives, for example, the instruction of the manager of the management server 20 and notifies the instruction to the CPU 21. For example, a button, a keyboard, a mouse, and a touch panel, and the like are used as the input section 28.

The display section 29 is a display device that displays information, which is processed by the CPU 21, as an image. For example, a liquid crystal display, an organic Electro Luminescence (EL) display, and the like are used as the display section 29. The screen, on which the image is displayed, of the display section 29 is an example of a display area according to the exemplary embodiment.

Meanwhile, the units which are connected to the I/O 25 are not limited to the various units illustrated in FIG. 3. For example, a printing unit, which prints the image displayed on the display section 29 on paper or the like, may be connected to the I/O 25.

Figure 4:
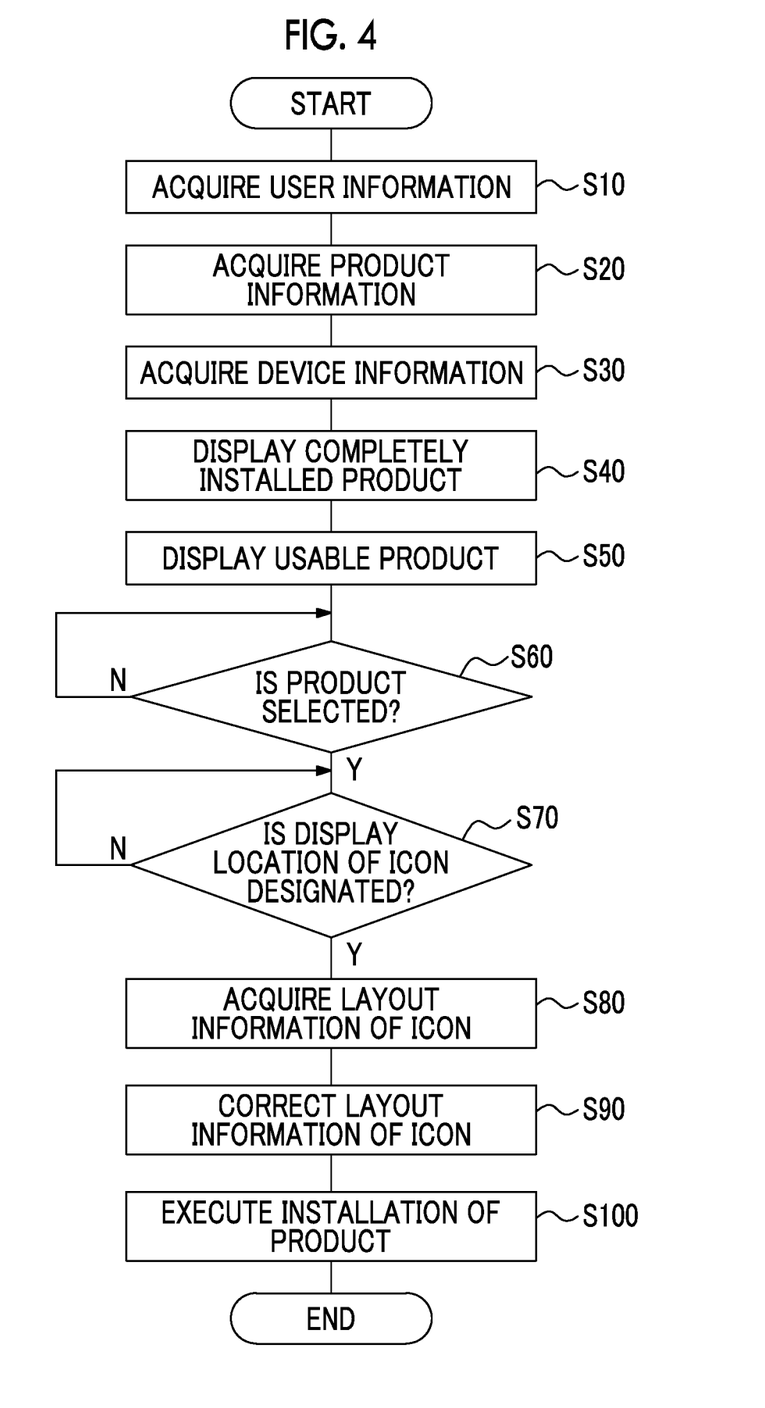
FIG. 4 is a flowchart illustrating an example of a flow of information processing.

Subsequently, an operation of the management server 20 according to the exemplary embodiment will be described. FIG. 4 is a flowchart illustrating an example of a flow of information processing executed by the CPU 41, for example, in a case where the application installment instruction with respect to the device 10 is received from the manager.

The information processing program, which prescribes the information processing, is stored in advance, for example, in the ROM 22 of the management server 20. The CPU 21 of the management server 20 reads the information processing program stored in the ROM 22, and executes the information processing. Meanwhile, it is assumed that the device 10, which is an application installation target, is set in advance by the manager. In addition, a plurality of devices 10 may be the application installation target. However, for easy understanding of the description, a case where one device 10, which is the application installation target, is provided is described first.

First, the CPU 21 displays a selection screen, which causes the manager to select an application to be installed in the device 10, on the display section 29.

Therefore, in step S10, the CPU 21 acquires the user information of the user from the information DB 30, and stores the user information in the RAM 23.

In step S20, the CPU 21 acquires information of a list of applications, which are installed in the device 10 from the management server 20, that is, the product information of the application, which is managed in the management server 20, from the information DB 30, and stores the information in the RAM 23.

In step S30, the CPU 21 acquires the device information from the device 10, which is an application installation target (hereinafter, simply referred to as "device 10"), through the communication line 40, and stores the device information in the RAM 23.

In step S40, the CPU 21 extracts a name of the completely installed application from the device information acquired in step S30, and controls the display section 29 such that a list of completely installed applications in the device 10 is displayed on the selection screen.

In step S50, the CPU 21 extracts a remaining application other than the completely downloaded application, that is, the usable application, from the acquirable application, which is included in the user information of the user who uses the device 10, from the user information acquired in step S10, and controls the display section 29 such that the list of usable applications is displayed on the selection screen.

Through the above-described process, the list of completely installed applications of the device 10 and the list of usable applications are displayed on the selection screen, which is displayed on the display section 29, of the management server 20.

The manager refers to the selection screen, and selects the application to be installed in the device 10 from the list of usable applications.

Accordingly, in step S60, the CPU 21 determines whether or not the manager selects the application to be installed in the device 10. In a case where no application is selected, the determination process in step S60 is repeatedly executed, thereby monitoring a selection operation performed by the manager. In contrast, in a case where the application is selected, the process proceeds to step S70.

Figure 5:
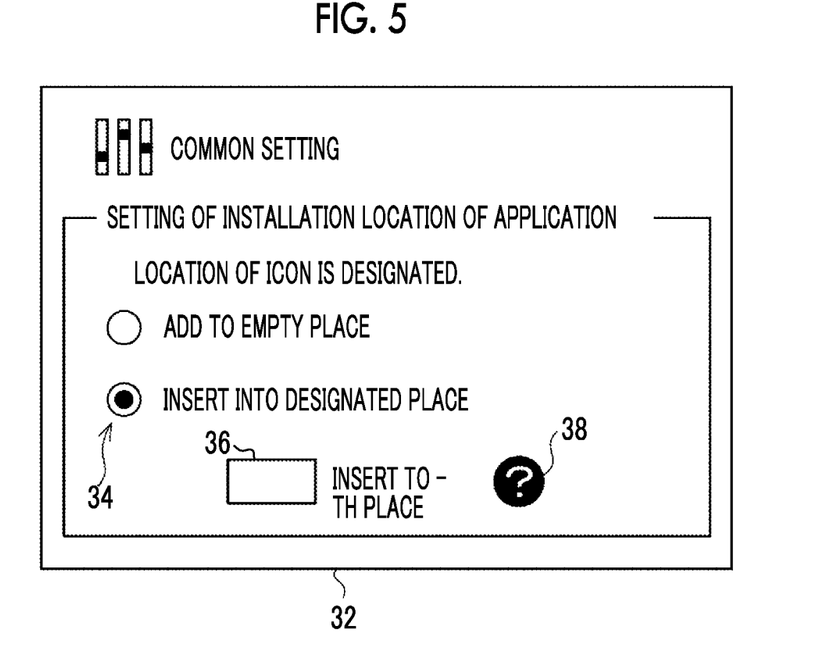
FIG. 5 is a diagram illustrating an example of a designation screen.

In a case where the application to be installed in the device 10 is selected by the manager, a designation screen 32 as illustrated in FIG. 5 is displayed.

The designation screen 32 is a screen, which is used to designate the display location of the icon, of the screen of the device 10 which is the application installation target. The designation screen 32 includes, for example, a radio button 34 which is used to selectively designate whether or not to perform "addition to empty place" or "insertion into the designated place" on the icon of the application to be installed, an edit box 36 which is used to input a display number corresponding to the display location of the icon, and a help button 38 which is used to display explanation relevant to the display location of the icon.

The "addition to the empty place" performed on the icon is to display the icon of the application to be installed in the display location where no icon is disposed. In addition, the "insertion into the designated place" performed on the icon is to display the icon of the application to be installed in the display location corresponding to the display number, which is input to the edit box 36, regardless whether or not the icon is already disposed.

Explanation of the display number corresponding to the display location is displayed on the display section 29 in a case where, for example, the manager presses the help button 38.

Figure 6:
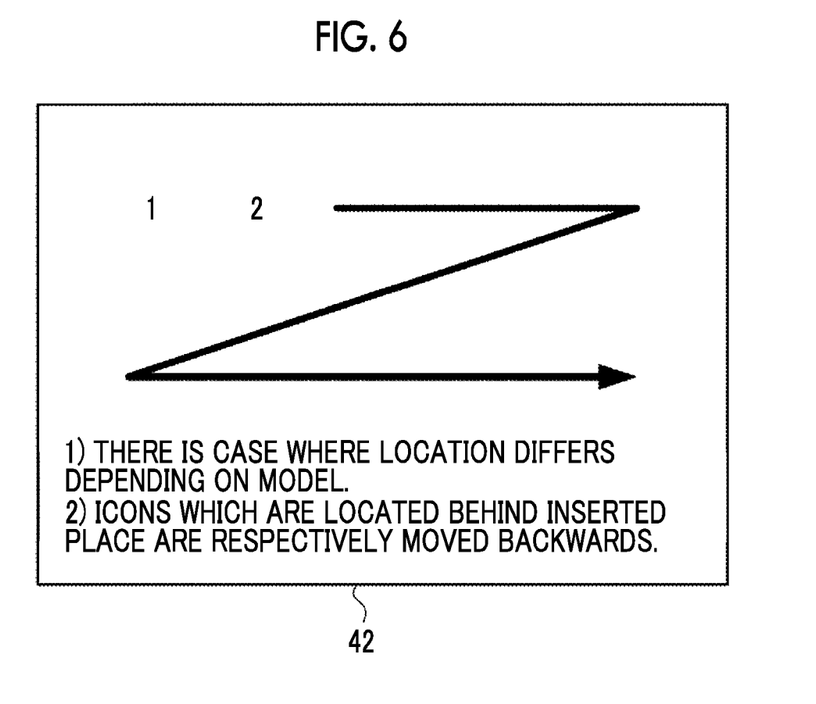
FIG. 6 is a diagram illustrating an example of an explanation screen.

FIG. 6 is a diagram illustrating an example of an explanation screen 42 which is used to explain the display number for designating the display location of the icon. The display number for designating the display location of the icon is a number which is sequentially assigned from a reference location, which is decided in advance, of the screen of the device 10 so as not to be duplicated. The example of the explanation screen 42 illustrated in FIG. 6 expresses that an upper left part of the screen of the device 10 is set to the reference location, and the display number is sequentially assigned toward a right direction from the reference location. In addition, the example of the explanation screen 42 expresses that, in a case where assignment of the display number reaches a right end of the screen, the display number is sequentially assigned again toward the right direction from the left end of the screen while moving down by one line until a lower end of the screen is reached.

It is possible for the manager to grasp a number equivalent to the display number, which corresponds to a display location that is desired to display the icon, by referring to the explanation screen 42 on which explanation relevant to icon alignment. Here, the explanation screen 42 is set to a screen which is different from the designation screen 32, as an example. However, even though the manager does not press the help button 38, content of the explanation screen 42 may be initially displayed on the designation screen 32. That is, the explanation screen 42 is also a part of the designation screen 32.

Although the reference location is set to the upper left part of the screen in FIG. 6, a place, to which the reference location is set, is not restricted, and may be set to any location such as an upper right part or a lower left part of the screen. In addition, a direction, in which the display numbers are assigned from the reference location, is not restricted, and, for example, the display numbers may be assigned to a downward direction from the reference location.

In step S70, the CPU 21 determines whether or not the display location of the icon is designated on the designation screen 32. Meanwhile, a case where the display location of the icon is designated includes a case where a radio button corresponding to "addition to the designated place" is selected in addition to the case where the radio button corresponding to "addition to the empty place" is selected on the designation screen 32 and the display number corresponding to the display location of the icon is input to the edit box 36.

In a case where the display location of the icon is not designated, the determination process in step S70 is repeatedly executed, thereby monitoring the designation, which is performed by the manager, of the display location of the icon. In contrast, in a case where the display location of the icon is designated by the manager, the process proceeds to step S80.

In step S80, the CPU 21 acquires the layout information of the icon from the device 10. The layout information of the icon is information which indicates combination of the display number corresponding to the display location of the icon and the icon which is disposed in the display location indicated by the display number. A description format of the layout information of the icon is not restricted and it is possible to describe the layout information using, for example, an Extensible Markup Language (XML) format.

The CPU 21 grasps the display location of the icon, which is displayed on the screen of the device 10 before the application is installed, by acquiring the layout information of the icon from the device 10. A case where no icon is associated with the display number corresponding to the display location of the icon indicates a case where the layout information of the icon indicates that no icon is disposed in the display location which is indicated by the display number.

In step S90, the CPU 21 corrects the layout information of the icon acquired in step S80 such that the selected icon of the application, that is, the icon of the application which is installed in the device 10 by the manager from now on, is disposed in the designated display location of the icon.

Specifically, the CPU 21 associates the display number, which is the same as the display number that is input to the edit box 36 of the designation screen 32 with the icon of the application to be installed with respect to the acquired layout information of the icon.

According to a case, there is a case where the display number, which is the same as the display number that is input to the edit box 36 of the designation screen 32, is already associated with another icon, which is different from the icon of the application to be installed, in the acquired layout information of the icon. In this case, the CPU 21 generates a warning screen which is used to notify that it is not possible to dispose the icon of the application to be installed in the designated display location, and displays the warning screen on the display section 29.

The manager who recognizes the warning screen may input a display number corresponding to a new display location to the edit box 36, or may forcibly dispose the icon of the application to be installed in the designated display location by pressing, for example, a "forced execution" button included in the warning screen.

In a case where the "forced execution" button included in the warning screen is pressed, the CPU 21 causes icons associated with the respective display numbers subsequent to the display number, which is input to the edit box 36, to be deviated to subsequent display numbers one by one, thereby making a state in which an item associated with the display number that is input to the edit box 36 does not exist. Further, the CPU 21 performs correction with respect to the layout information of the icon such that the icon of the application to be installed is associated with the display number which is input to the edit box 36.

Figure 7A:
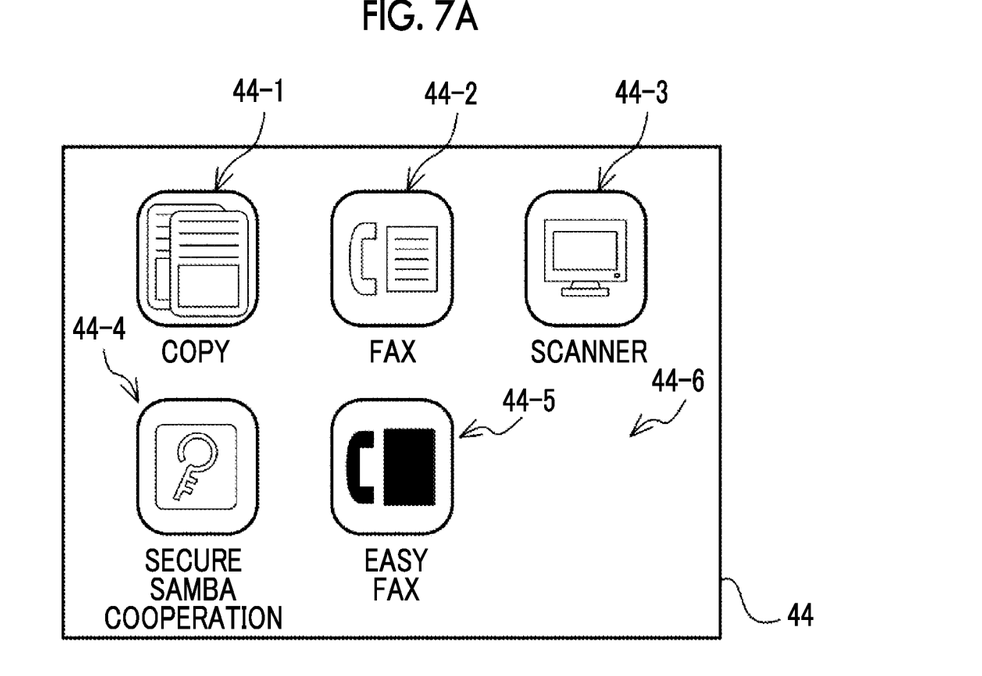
FIGS. 7A and 7B are diagrams illustrating examples in which icons are displayed.
Figure 7B:
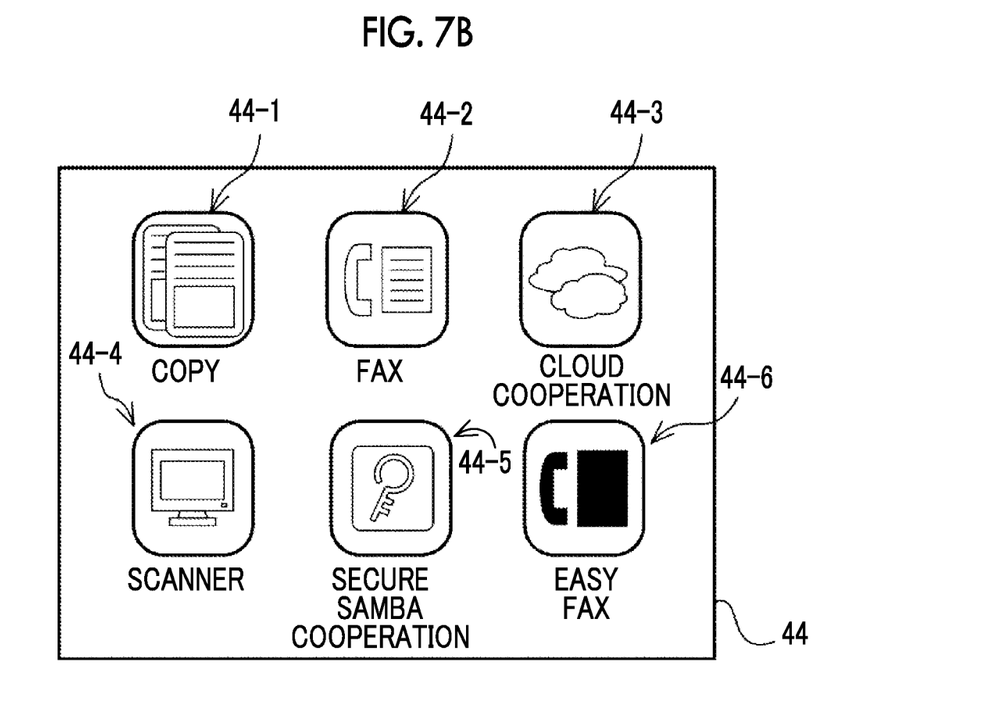

FIGS. 7A and 7B are diagrams illustrating examples in which icons are displayed in a display area 44 in the screen of the device 10. It is assumed that the icons in the display area 44 are displayed as in FIG. 7A before the application is installed. In FIGS. 7A and 7B, a display location of an icon, which corresponds to a display number "M (M is an integer which is equal to or larger than 1)" corresponds to an area 44-M.

For example, in a case where "3" is input to the edit box 36 by the manager, an icon which is used to execute a scanner already exists in an area 44-3. Therefore, the CPU 21 performs correction such that the icon of the scanner is associated with a display number "4", an icon of secure SAMBA cooperation is associated with a display number "5", and an icon of an easy FAX is associated with a display number "6", respectively. In addition, in a case where the CPU 21 associates the icon of the application to be installed (in the example of FIG. 7B, a cloud cooperation) with the display number "3", the icon of the cloud cooperation is displayed in the area 44-3, the icon of the scanner is displayed in an area 44-4, the icon of the secure SAMBA cooperation is displayed in an area 44-5, and the icon of the easy FAX is displayed in an area 44-6, respectively, as illustrated in FIG. 7B.

Since a plurality of independent functions may be included in an application, there is a case where a plurality of icons are associated with one application. In this case, the CPU 21 performs correction for deviating icons, which are associated with the respective display numbers subsequent to the display number that is input to the edit box 36, to subsequent display numbers as many as the number of icons which are associated with the application. Further, the CPU 21 performs association the respective icons, which are associated with the application to be installed, from the display number that is input to the edit box 36 such that the plurality of icons associated with the application to be installed are sequentially displayed side by side on the screen of the device 10. The product information may be referred to for the number of icons which are associated with the application.

Meanwhile, the CPU 21 may associate the icon, which is associated with the display number that is input to the edit box 36, with a display number with which no icon is associated, thereby making a state in which the item associated with the display number that is input to the edit box 36 does not exist. A method for correcting the layout information of the icon is based on a setting which is instructed by the manager in advance.

In step S100, the CPU 21 controls the communication section 27, and causes the device 10 to install the application selected by the manager through the communication line 40. In addition, the CPU 21 controls the communication section 27, and transmits the layout information, which is corrected in step S90 through the communication line 40, of the icon to the device 10 such that the icon of the application to be installed is displayed in the display location designated by the manager.

Therefore, the application selected by the manager is installed in the device 10, and the item of the application, which is installed in the display location designated by the manager, is displayed on the screen of the device 10. As described above, the information processing illustrated in FIG. 4 ends.

Meanwhile, in the information processing of FIG. 4, the display location of the icon of the application to be installed in the device 10 is received before the application is installed. However, the display location may be received after the application is installed.

For example, in a case where it is determined that the application is selected in step S60, the CPU 21 executes steps S80 to S100 without executing step S70. In this case, the CPU 21 refers to the layout information of the icon acquired from the device 10, corrects the layout information of the icon such that the icon of the application to be installed is associated with the display number, with which no icon is associated, and transmits the corrected layout information of the icon to the device 10. That is, on the screen of the device 10, a newly installed icon is displayed in a location where any icon is displayed until that time.

Thereafter, in a case where the CPU 21 receives the designation of the display location from the designation screen 32, the CPU 21 acquires a difference between the layout information of the icon, which is acquired in step S80, of the device 10 before the application is installed and the layout information of the icon, which is corrected in step S90, of the device 10 after the application is installed.

The acquired difference between the pieces of layout information of the icon indicates the display location of the icon of the application, which is installed in the device 10 in step S100, on the screen of the device 10. Accordingly, the CPU 21 corrects the layout information of the icon such that the icon, which is associated with the display number indicated by the difference between the pieces of layout information of the icon, is associated with the display number which is designated by the manager as the display location of the icon.

In a case where the CPU 21 performs control such that the corrected layout information of the icon is transmitted to the device 10 again, the icon of the installed application is displayed in a designated display location.

Furthermore, various modification examples are applied to the information processing in the management server 20.

A size of the screen of the device 10 differs for each type of the device 10 and there is a case where the size of the screen differs for each model of the device 10 even in a case of the same type. For example, in a case where the types of devices 10 are different from each other as in a smartphone and a remote controller, the size of the screens of the devices 10 are different from each other. Even in the smartphones, there is a case where the sizes of the screens are different between a model of a smartphone made in a company A and a model of a smartphone made in a company B. Furthermore, in other words, even in the smartphone made in the same company A, there is a case where the sizes of the screens are different for respective models.

Accordingly, in the case where the sizes of the screens are different from each other, there is a case where an icon is not disposed in the same display location even though the same display number is input to the edit box 36.

Figure 8A:
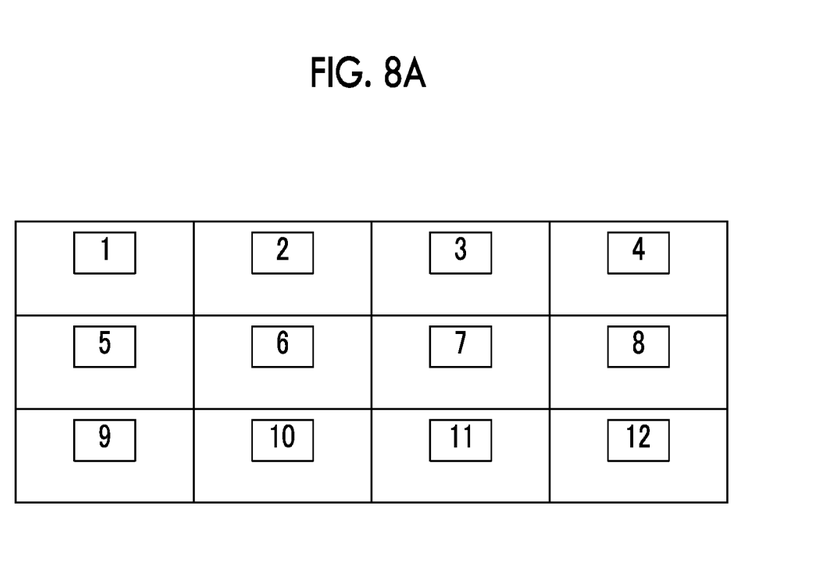
FIGS. 8A and 8B are diagrams illustrating examples of locations in which the icons are displayed.
Figure 8B:
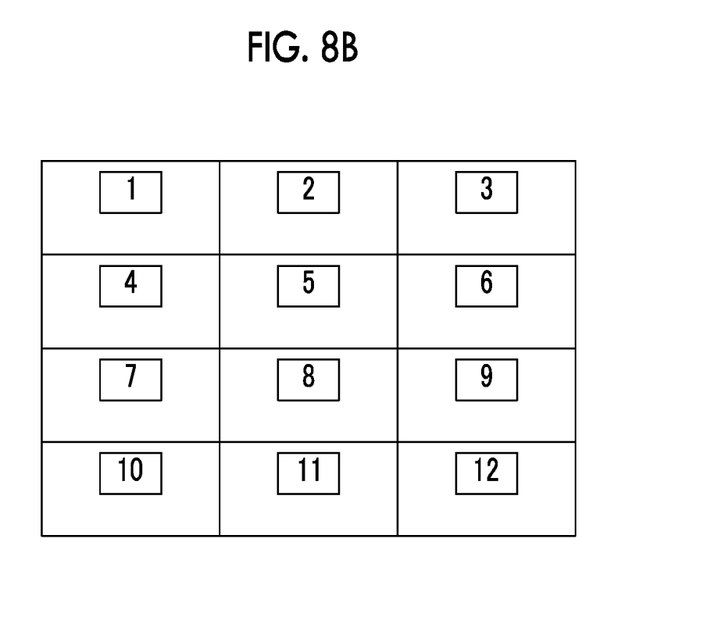

FIGS. 8A and 8B are diagrams illustrating examples of screens which have different sizes. FIG. 8A illustrates a screen which has a size in which icons are displayed in 3 rows×4 columns, and FIG. 8B illustrates a screen which has a size in which icons are displayed in 4 rows×3 columns. For example, in a case where a display number "4" is input to the edit box 36, the icon is displayed at a right end of a first row in the device 10 which has the size of the screen illustrated in FIG. 8A. Meanwhile, the icon is displayed at a left end of a second row in the device 10 which has the size of the screen illustrated in FIG. 8B.

Accordingly, in a case where the management server 20 displays the explanation screen 42, the management server 20 may acquire the configurational information of the screen of the device 10 such that the actual display location of the icon in the device 10 is described, as illustrated in FIGS. 8A and 8B. That is, the management server 20 displays information which indicates an actual correspondence between the display number used to designate the display location of the icon in the device 10, and the display location of the icon according to the configurational information of the screen in the device 10.

As described above, the management server 20 may display different screens which are suitable to the designation of the display location of the icon according to the configurational information of the screen in the device 10.

For example, the device 10 includes a unit that includes a plurality of pages, in which the icon is disposed, and that displays a page selected by the user on the screen. In this case, the management server 20 displays the designation screen 32 that receives designation of a display location, in which the icon is disposed, in the page. In addition, for example, the device 10 includes an area, in which the icon is disposed and which is set to be larger than a size of the display area such that a target icon is displayed in such a way that the user scrolls the screen. In this case, based on the configurational information of the screen, display may be performed such that it is possible for manager to understand the display location of the icon, which is included in a range that is initially displayed on the screen without scrolling the screen.

In addition, according to the device 10, there is a case where setting is performed such that it is not possible to change a display location of an icon, which is included in a predetermined specific location of the screen where the icons are displayed in a list. For example, the upper left part of the screen, which is initially displayed after the device 10 is driven, is a location where a line of sight of the user is easily transformed initially, compared to another location. In addition, a lower right part of the screen is a location in which it is easy to move a finger of the user, that is, a location which is easily operated, compared to another location. Accordingly, in the specific location whose operability is excellent, that is, in a priority area, for example, it is preferable that the icon of the application, which has high frequency compared to another application, is displayed. Therefore, there is a case where setting is performed such that it is not possible to change the display location of an icon in the priority area, as a specification of the device 10. In addition, there is the device 10 in which it is possible for the user to set the priority area.

Accordingly, in a case where the management server 20 receives the display number corresponding to the display location included in the priority area through the designation screen 32, the management server 20 generates the warning screen which provides a notification that it is not possible to dispose the icon in the designated display location due to the priority area and another display location should be selected, and displays the warning screen on the display section 29. In addition, the management server 20 may display the display number corresponding to the display location, which is included in the priority area of the device 10, on the warning screen as reference information used to designate the display location of the icon.

Meanwhile, the priority area of the device 10 is included in the device information. In a case where the device 10 disposes icons over a plurality of pages, the priority area is set to an initially displayed page, for example, a top page while the user does not perform an operation relevant to the screen display.

In a case where a plurality of devices 10 which are application installation destinations are designated, the icons of the applications to be installed are disposed in the display locations of the respective devices 10 corresponding to the display numbers designated on the designation screen 32. In the management server 20, due to the setting, it is possible to individually designate the display locations of the icons for the plurality of devices 10 using the respective designation screens 32, and it is possible to receive the display number which is input to the designation screen 32 as the display number which is commonly applied to the respective devices 10 and to collectively designate the display locations of the icons in the respective devices 10 through one display number input.

However, as being already described with reference to FIGS. 8A and 8B, due to the difference in the types and models of the devices 10, there is a case where the display locations of the icons in the respective devices 10 are different from each other even in a case where the display numbers designated in the designation screens 32 are the same.

Accordingly, the management server 20 may refer to the pieces of device information acquired from the respective devices 10, may perform classification on the devices 10, which are the application installation targets, for the respective models, and may receive the display numbers from the designation screen 32 for the respective models.

For example, it is assumed that a relationship between the display number and the display location of the icon in the model A is illustrated in FIG. 8A and a relationship between the display number and the display location of the icon in the model B is illustrated in FIG. 8B. In a case where the display numbers are received from the designation screen 32 for the respective models, the display number with respect to the model A is set to "5" and the display number with respect to the model B is set to "4". Therefore, even in a case where the models are different from each other, the icon of the application to be installed is displayed at the same location on the screen of the device 10. In this case, in a case where the relationship between the display number and the display location of the icon for the respective models is displayed on the explanation screen 42, it is helpful for the manager to designate the display location of the icon.

In addition, even in a case where at least one of the types or models of the plurality of devices 10, which are the application installation targets, are different, the management server 20 may correct the pieces of layout information of the respective devices 10 such that the icons of the respective devices 10, which are newly installed, are displayed in a common display location by one input of the display number.

Specifically, in a case where the management server 20 receives the display numbers from the designation screen 32, the management server 20 refers to the pieces of configurational information of the screens of the respective devices 10, and acquires the display locations of the icons of the respective devices 10 corresponding to the received display numbers. In a case where the acquired display locations of the icons are different, the management server 20 sets the display locations of the icons such that the display locations of the icons of the respective devices 10 are the same. For example, any one display location of the acquired respective display locations of the icons may be set to the common display location, and a display location, in which an icon common to the respective devices 10 is not set, may be set to the common display location. In addition, a display location, in which a sum of distances from the acquired respective display locations of the icons is as short as possible, may be set to the common display location.

In addition, timing, at which the display location of the icon of the device 10 is designated in the management server 20, is not limited to time in which the application is installed. For example, the display location of the icon of the application, which is already installed in the device 10, may be designated such that the display location of the icon is changed.

Specifically, the display location of the icon may be changed by correcting the layout information of the icon such that the icon of the application, which is desired to change the display location, is associated with the display number designated on the designation screen 32 with respect to the device 10 which is selected as a target for changing the display location of the icon.

As described above, according to the management server 20 of the exemplary embodiment, setting of the display location of the icon on the screen of the device 10 is performed from the remote place through the communication line 40.

Meanwhile, in a case of the device 10 supplied to the user from a company for business, in order to prevent the device 10 from malfunctioning due to unintended setting change performed by the user, there is a case where setting is performed such that installation and uninstallation of the application, a change in the display location of the icon, and the like are not performed even in a case of directly operating the device 10 by being in contact with the device 10.

As described above, even in a case of the device 10 which is set such that the designation of the display location of the icon is not performed in an operation from the device 10, the designation of the display location of the icon of the device 10 is performed from the management server 20 through the communication line 40.

Hereinabove, although the present invention is described using the exemplary embodiment, the present invention is not limited to a scope described in the exemplary embodiment. Addition of various changes or improvements to the exemplary embodiment is possible without departing from the gist of the invention, and a form to which the changes or the improvements are added is also included in a technical scope of the invention. For example, a sequence of the process may be changed without departing from the gist of the invention.

In addition, in the exemplary embodiment, a form in which the information processing is realized by software is described as an example. However, the processing equivalent to the flowchart illustrated in FIG. 4 may be implemented on, for example, an Application Specific Integrated Circuit (ASIC) and may be processed by hardware. In this case, compared to a case where the information processing is realized by software, the processing is speeded up.

In addition, in the above-described exemplary embodiment, a form in which the information processing program is installed in the ROM 22 is described. However, the present invention is not limited thereto, and it is possible to provide the information processing program according to the present invention in a form of being recorded in a computer-readable storage medium. For example, the information processing program according to the present invention may be provided in a form of being recorded in an optical disk such as a Compact Disc (CD)-ROM or a Digital Versatile Disc (DVD)-ROM. In addition, the information processing program according to the present invention may be provided in a form of being recorded in a semiconductor memory such as a Universal Serial Bus (USB) memory or a flash memory. Furthermore, the information processing program according to the present invention may be acquired from an external device, which is connected to the communication line 40 and is not illustrated in the drawing, through the communication line 40.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be prescribed by the following claims and their equivalents.

What is claimed is:

1. An information processing apparatus comprising:
a memory; and
a processor, coupled to the memory, wherein the processor is configured to:
receive an instruction to install a function in a device connected to a communication line, and receives designation of a display location of a selection part, which is used to select the function, on a screen displayed in the device in a case where the function is installed in the device, wherein the function changes according to an application to be installed, and the application to be installed is managed by a management server; and
control the screen of the device such that the selection part of the function is displayed in the display location, in which the designation is received, on the screen of the device, wherein the selection part of the function is associated with the application to be installed,
wherein the processor is further configured to:
in a case where a plurality of the devices are connected to the communication line, control screens of the respective devices such that selection parts of functions are respectively displayed in display locations, in which designations are received, on the screens of the respective devices, wherein the plurality of the devices are designated as application installation destinations;
receive the designations of the display locations, in which the selection parts of the functions are displayed, for respective models of the devices; and
control the screens for the respective models of the devices such that the selection parts of the functions are displayed in the display locations in which designations are received.

2. The information processing apparatus according to claim 1, wherein the processor is further configured to:
display a designation screen, which is used to designate the display location of the selection part of the function, in a display area, and
receive the display location of the selection part of the function from the designation screen displayed.

3. The information processing apparatus according to claim 2, wherein the processor is further configured to:
acquire configurational information of the screen in the device, and
display different designation screens in the display area according to the configurational information of the screen, which is acquired, in the device.

4. The information processing apparatus according to claim 1, wherein the processor is further configured to:
notify that it is not possible to display the selection part of the function in the received display location in a case where a selection part of a specific function, which is different from the function, is already displayed in the display location of the selection part of the function, which is received.

5. The information processing apparatus according to claim 2, wherein the processor is further configured to:
   notify that it is not possible to display the selection part of the function in the received display location in a case where a selection part of a specific function, which is different from the function, is already displayed in the display location of the selection part of the function, which is received.

6. The information processing apparatus according to claim 3, wherein the processor is further configured to:
   notify that it is not possible to display the selection part of the function in the received display location in a case where a selection part of a specific function, which is different from the function, is already displayed in the display location of the selection part of the function, which is received.

7. The information processing apparatus according to claim 1, wherein the processor is further configured to:
   control the screen of the device such that the selection part of the function is not displayed in a specific location, which is set in advance, of the screen of the device.

8. The information processing apparatus according to claim 2, wherein the processor is further configured to:
   control the screen of the device such that the selection part of the function is not displayed in a specific location, which is set in advance, of the screen of the device.

9. The information processing apparatus according to claim 3, wherein the processor is further configured to:
   control the screen of the device such that the selection part of the function is not displayed in a specific location, which is set in advance, of the screen of the device.

10. The information processing apparatus according to claim 4, wherein the processor is further configured to:
    control the screen of the device such that the selection part of the function is not displayed in a specific location, which is set in advance, of the screen of the device.

11. The information processing apparatus according to claim 5, wherein the processor is further configured to:
    control the screen of the device such that the selection part of the function is not displayed in a specific location, which is set in advance, of the screen of the device.

12. The information processing apparatus according to claim 6, wherein the processor is further configured to:
    control the screen of the device such that the selection part of the function is not displayed in a specific location, which is set in advance, of the screen of the device.

13. The information processing apparatus according to claim 7,
    wherein the specific location is set to at least one of an upper left part or a lower right part of the screen in a top page in which the selection part of the function installed in the device is displayed as a list.

14. The information processing apparatus according to claim 8,
    wherein the specific location is set to at least one of an upper left part or a lower right part of the screen in a top page in which the selection part of the function installed in the device is displayed as a list.

15. The information processing apparatus according to claim 9,
    wherein the specific location is set to at least one of an upper left part or a lower right part of the screen in a top page in which the selection part of the function installed in the device is displayed as a list.

16. The information processing apparatus according to claim 1, wherein the processor is further configured to:
    control the screen of the device by transmitting layout information, which prescribes a layout of the screen of the device, through the communication line with respect to the device in which the designation of the display location of the selection part of the function is not performed through an operation through contact.

17. The information processing apparatus according to claim 1, wherein the processor is further configured to:
    control the screens of the respective devices such that the selection parts of the functions are displayed in a common display location of the screens of the respective devices.

18. A non-transitory computer readable medium storing an information processing program causing a computer to function as the information processing apparatus according to claim 1.

* * * * *